United States Patent [19]

Tsuboi

[11] Patent Number: 4,480,603
[45] Date of Patent: Nov. 6, 1984

[54] CHAIN TIGHTENING MECHANISM FOR DOHC ENGINE

[75] Inventor: Masaharu Tsuboi, Saitama, Japan

[73] Assignee: Honda Giken Kogyo Kabushiki Kaisha, Tokyo, Japan

[21] Appl. No.: 350,068

[22] Filed: Feb. 18, 1982

[30] Foreign Application Priority Data

Feb. 20, 1981 [JP] Japan ............................ 56-24648
Feb. 20, 1981 [JP] Japan ............................ 56-24649
Mar. 27, 1981 [JP] Japan ............................ 56-44796
Mar. 27, 1981 [JP] Japan ............................ 56-44797

[51] Int. Cl.³ ..................................... F01L 1/04
[52] U.S. Cl. ........................... 123/90.31; 123/90.27; 474/111
[58] Field of Search ............... 123/90.31, 90.27, 90.15, 123/90.17, 192 R; 474/111, 136

[56] References Cited

U.S. PATENT DOCUMENTS 2,279,413  4/1942  Read ............................ 123/90.15
2,782,650  2/1957  Fergason ...................... 474/136
3,441,009  4/1969  Rafanelli ...................... 123/90.15

FOREIGN PATENT DOCUMENTS 2655102  6/1978  Fed. Rep. of Germany ... 123/90.31

Primary Examiner—Ira S. Lazarus
Assistant Examiner—R. S. Bailey
Attorney, Agent, or Firm—Lyon & Lyon

[57] ABSTRACT

A V-type internal combustion engine having double overhead camshafts contains automatic mechanism for maintaining tension in the endless timing chain which drives the camshafts from the engine crankshaft. The two sides of the V-type engine are substantial duplicates. A tensioner body engages the slack side of the chain and is caused to move in a direction to tighten the chain to maintain desired chain tension. The tensioner body is operated by a curved arm member which is pivoted to a stationary support at a position in the dead space between the driven sprockets for the two camshafts. Resilient means acts on the curved arm member in a direction to tighten the tensioner body against the chain, and a rocking member acted on by the resilient means prevents retrograde movement of the curved arm member, so that chain tension is maintained even when the chain stretches after a period of use.

4 Claims, 5 Drawing Figures

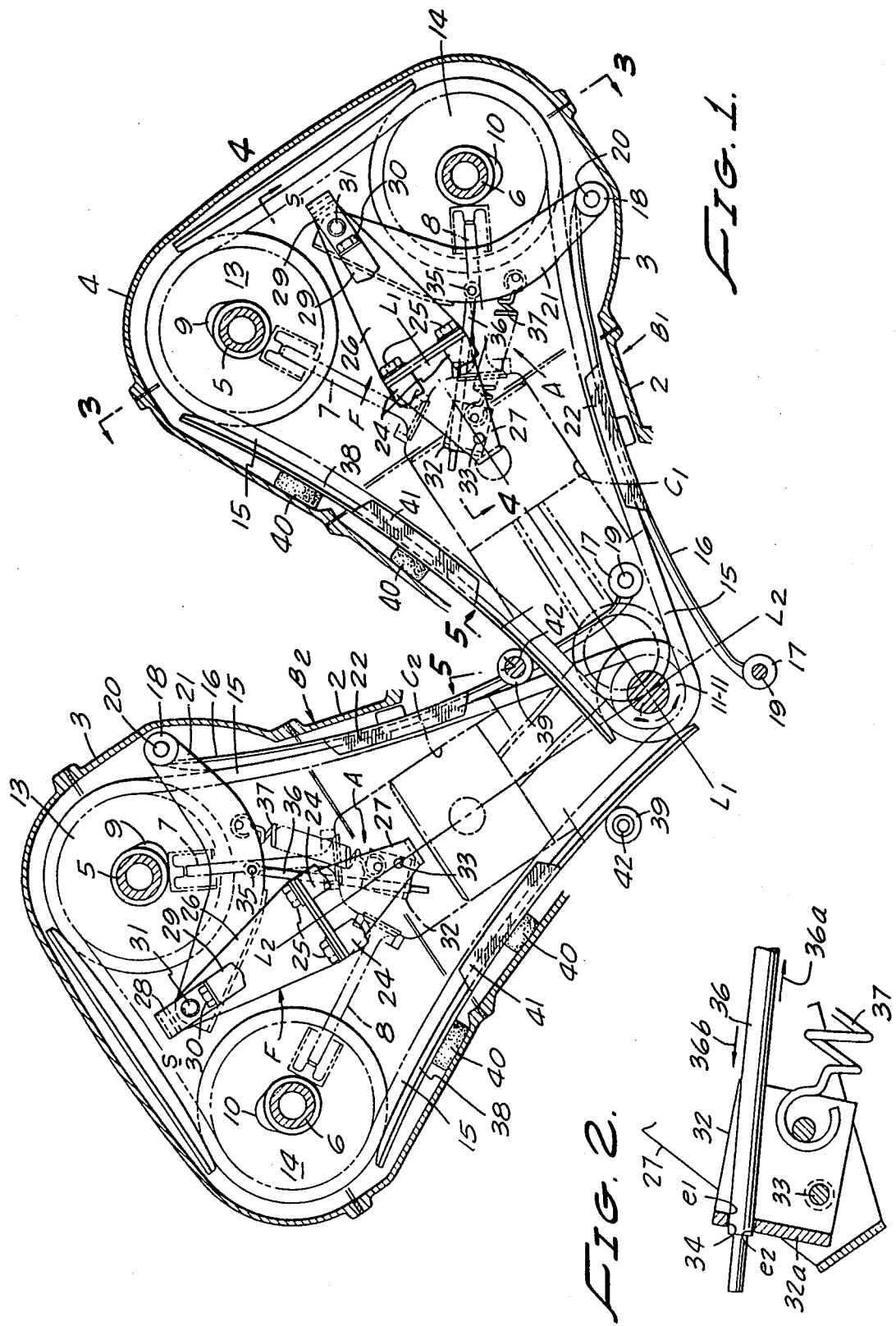

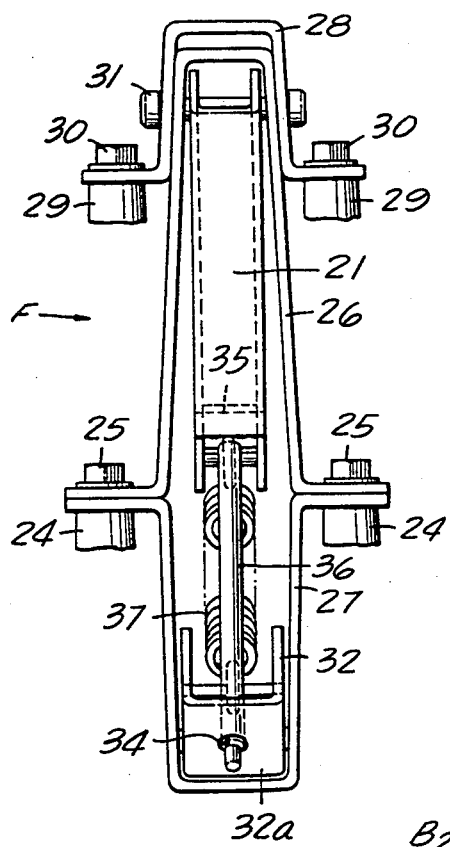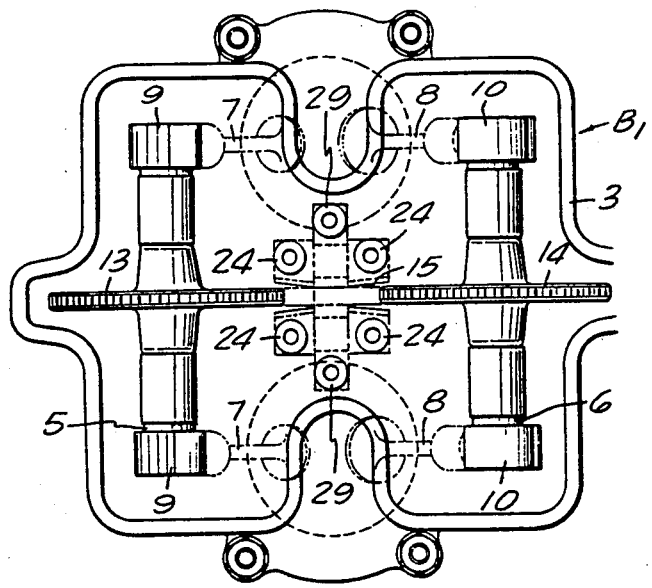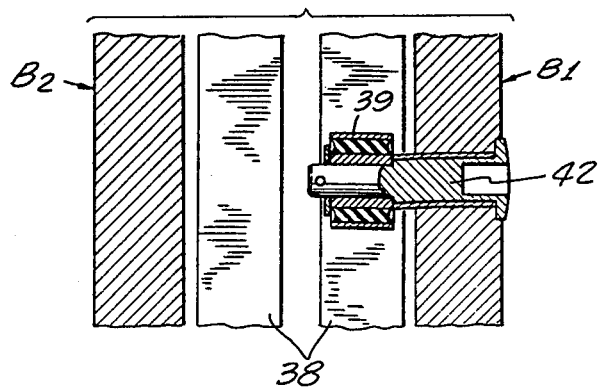

CHAIN TIGHTENING MECHANISM FOR DOHC ENGINE

This invention relates to internal combustion engines and is particularly directed to a device for automatically tightening the timing chain in a double overhead camshaft engine.

An important object of this invention to provide an automatic device for maintaining proper tension in the endless timing chain which drives the two camshafts from the engine crankshaft.

A more particular object is to provide a chain tensioning device of this type which is totally received within the enclosing loop of the endless chain, which device is partly positioned in the dead space between the two camshafts, and which does not protrude outside of the engine cylinder block or cylinder head or head cover.

Other and more detailed objects and advantages will appear hereinafter.

In the Drawings:

FIG. 1 is a sectional elevation showing a preferred embodiment of this invention.

FIG. 2 is a sectional detail showing a portion of FIG. 1 on an enlarged scale.

FIG. 3 is a sectional view taken substantially on the lines 3—3 as shown on FIG. 1.

FIG. 4 is a view partly broken away taken substantially on the lines 4—4 as shown on FIG. 1.

Referring to the drawings, the V-type internal combustion engine is provided with a double overhead cam valve actuating mechanism. Two cylinder units $C_1$ and $C_2$ are arranged in the shape of a letter "V". A crankshaft 1 is positioned at the intersection of the respective center lines $L_1$-$L_1$ and $L_2$-$L_2$ of the cylinder units $C_1$ and $C_2$. The crankshaft rotates in a counterclockwise direction, as viewed in FIG. 1. Cylinder heads 3 and 3 are fixed on cylinder blocks 2 and 2, and are enclosed within head covers 4 and 4.

In the respective cylinder heads 3 and 3, camshafts 5 operate the intake valves and the cam shafts 6 operate the exhaust valves. The camshafts 5 and 6 are all parallel to the crankshaft 1. Cams 9 on the camshafts 5 operate the intake valves 7, and cams 10 on the camshafts 6 operate the exhaust valves 8.

Since the two sides of the V-type engine are substantial duplicates, the following description of one side will suffice for both.

A driving sprocket 11 is fixed to the crankshaft 1 and driven sprockets 13 and 14 are fixed to the camshafts 5 and 6, respectively. The endless timing chain 15 runs over the driving sprocket 11 and both of the driven sprockets 13 and 14.

Outside of the slack side of the chain 15 there is arranged a curved tensioner body 16 which has its stationary end 17 pivotally supported on the body of the internal combustion engine by means of a pivot pin 19. The moveable end of the body 16 is connected by the pivot pin 20 to the free end of the curved arm member 21. To the back side of the intermediate portion of the tensioner body 16 there is fixed a guide member 22 having a generally C-shaped cross section which encloses both sides of the chain 15 so that it may not deflect to the right or left. A teflon member is applied to the front side of the tensioner body 16, for contact with the chain 15 to enhance the wear-resisting and sliding characteristics.

An automatic tensioning mechanism A is provided for elastically urging the tensioner body 16 toward the chain 15 to impart a predetermined tension to the chain and to maintain the desired tension even when the chain stretches. Inside the loop of the endless chain 15 and between the crankshaft 1 and the paired camshafts 5 and 6 there is positioned a supporting frame 26 connected by bolts 25 to a lower column 24. As best shown in FIG. 3, at the cylinder head 3 there are erected between the driven sprockets 13 and 14 four lower columns 24 which are affixed to the cylinder head 3. In FIG. 4, the supporting frame F is constructed by integrally joining the upper supporting frame 26 and the lower supporting frame 27. An auxiliary frame 28 of channel cross section is carried on the upper end of the upper supporting frame 26. Bolts 30 secure the auxiliary frame 28 to the two upper columns 29 to extend integrally from the cylinder head 3. As shown in FIG. 3 the upper columns 29 and 29 are positioned between the paired driven sprockets 13 and 14 outside of the four lower columns 24, 24.

The curved arm 21 is pivoted at 31 to the upper supporting frame 26, and has a slot (not shown) for passage of timing chain 15. The curved arm member 21 has a generally C-shaped cross section, into which the outer circumference of the driven sprocket 13 extends. The rocking member 32 is hinged in a rocking manner to the lower end of the lower supporting frame 27 by means of pivot pin 33. The rocking member 32 has its bottom portion 32a formed with a retaining opening 34, in which there loosely extends the free end of the rod 36. The rod 36 is hinged to the intermediate portion of the curved arm member 21 by means of pivot pin 35. Between the intermediate portion of the curved arm member 21 and the rocking member 32 there is interposed a tension spring 37 which biases both the curved arm member 21 and the rocking member 32 to rock about the pivot pins 31 and 33 respectively, in a clockwise direction as shown in FIG. 1. The tensioner body 16 is thus forced into contact with the slack side of the endless chain 15 by means of the curved arm member 21. The clockwise rocking motion of the rocking member 32 brings the diagonal edges $e_1$ and $e_2$ of the retaining opening 34 into engagement with the free end of the rod 36, thereby to restrain movement of the rod 36 in the direction as shown by the arrow 36a in FIG. 2.

On the tension side of the timing chain 15 a stationary slider 38 is provided, curved in the shape of a bow. A roller element 39 is supported in a rocking manner upon a fixed guide pin 42 which is supported in cantilever fashion on the engine body. On the back side of an intermediate portion of the slider 38, and close to the driven sprocket 13 there are provided cushion members 40 which are made of elastic material and which contact the inner wall of the engine body. Slider 38 rocks on the roller element 39 to guide the chain 15 so that the tension side of the chain may run along a predetermined path. A guide member 41 is provided on an intermediate portion of the slider 38 and has a generally C-shaped cross section which encloses and guides the chain 15 to prevent sidewise deflection.

In operation, the crankshaft 1 rotates counterclockwise as shown in FIG. 1 so that the endless chain 15 rotates the driven sprockets 13 and 14, causing the cam shafts 5 and 6 to drive the valve actuating mechanisms. The tension force of the spring 37 elastically brings the tensioner body 16 into contact with the slack side of the chain 15 by means of the curved arm member 21. Predetermined tension is thereby maintained in the chain 15. When the chain lengthens after a period of service, the tension spring 37 rocks the curved arm member 21 in a clockwise direction as viewed in FIG. 1 in accordance with the amount of stretch of the chain. As a result a thrust in the direction of the arrow 36b in FIG. 2 causes the rod 36 instantly to release the rocking member 32 from the clockwise biasing force of the spring 37. The rod 36 moves in the direction of the arrow 36b to move the curved arm member 21 and thereby move the tensioner body 16 in a direction toward the chain 15. Thus the tension in the chain 15 is automatically adjusted to a predetermined level.

Summarizing, the device of the present invention employs a tensioner device outside the slack side of the endless chain 15, which device acts to move toward the chain 15 to increase its tension when the chain stretches. The chain tensioning device is positioned inside the boundaries of the endless chain 15 and in the space formed between the crankshaft 1 and the valve actuating camshafts 5 and 6. No part of the device protrudes out of the outer circumference of the engine body, whereby the engine body can be made remarkably compact as a whole.

Having fully described my invention it is to be understood that I am not to be limited to the details herein set forth, but that my invention is of the full scope of the appended claims.

I claim:

1. In an internal combustion engine of the DOHC type having a driveshaft sprocket, spaced camshaft sprockets and an endless timing chain in a loop driven by the driveshaft sprocket and driving the camshaft sprockets, the loop thereby having a slack side and a tension side, the improvement comprising, in combination:
   a tensioner body having a portion adapted to contact the slack side of the endless chain outwardly of the loop;
   an arm member;
   pivot means pivotally fixing said arm member at a stationary location inwardly of the loop, said tensioner body being pivotally connected to said arm member at a distance from said pivot means;
   a rod pivotally connected to said arm member at a distance from said pivot means;
   a rocking member pivoted at a stationary location inwardly of the loop and spaced from said pivot means, said rocking member including an opening slidably receiving said rod and permitting motion of the rod only in the direction away from said arm member; and
   resilient means applying a bias force to said arm member for moving said arm member in a direction causing the tensioner body to maintain tension in the chain.

2. In an internal combustion engine of the DOHC type having a driveshaft sprocket, spaced camshaft sprockets and an endless timing chain in a loop driven by the dirveshaft sprocket and driving the camshaft sprockets, the loop thereby having a slack side and a tension side, the improvement comprising, in combination:
   a tensioner body having a portion adapted to contact the slack side of the endless chain outwardly of the loop;
   an arm member being curved between its ends to embrace a portion of the periphery of one of the camshaft sprockets;
   pivot means pivotally fixing said arm member at a stationary location inwardly of the loop, said tensioner body being pivotally connected to said arm member at a distance from said pivot means;
   a rod pivotally connected to said arm member at a distance from said pivot means;
   a rocking member pivoted at a stationary location inwardly of the loop and spaced from said pivot means, said rocking member including an opening slidably receiving said rod and permitting motion of the rod only in the direction away from said arm member; and
   resilient means applying a bias force to said arm member for moving said arm member in a direction causing the tensioner body to maintain tension in the chain.

3. In an internal combustion engine of the DOHC type having a driveshaft sprocket, spaced camshaft sprockets and an endless timing chain in a loop driven by the driveshaft sprocket and driving the camshaft sprockets, the loop thereby having a slack side and a tension side, the improvement comprising, in combination:
   a tensioner body having a portion adapted to contact the slack side of the endless chain outwardly of the loop;
   an arm member;
   pivot means pivotally fixing said arm member at a stationary location inwardly of the loop, said tensioner body being pivotally connected to said arm member at a distance from said pivot means;
   a rod pivotally connected to said arm member at a distance from said pivot means;
   a rocking member pivoted at a stationary location inwardly of the loop and spaced from said pivot means, said rocking member including an opening slidably receiving said rod and permitting motion of the rod only in the direction away from said arm member;
   resilient means applying a bias force to said arm member for moving said arm member in a direction causing the tensioner body to maintain tension in the chain;
   a slider contacting the endless chain outwardly of the loop on the tension side thereof; and
   a stationary pin having a roller element thereon and positioned near the driveshaft sprocket, said slider contacting said roller element and being positioned between said roller element and the endless chain.

4. In an internal combustion engine of the DOHC type having a driveshaft sprocket, spaced camshaft sprockets and an endless timing chain in a loop driven by the driveshaft sprocket and driving the camshaft sprockets, the loop thereby having a slack side and a tension side, the improvement comprising, in combination:
   a tensioner body having a portion adapted to contact the slack side of the endless chain outwardly of the loop;
   an arm member;
   pivot means pivotally fixing said arm member at a stationary location inwardly of the loop, said tensioner body being pivotally connected to said arm member at a distance from said pivot means;

a rod pivotally connected to said arm member at a distance from said pivot means;

a rocking member pivoted at a stationary location inwardly of the loop and spaced from said pivot means, said rocking member including an opening slidably receiving said rod and permitting motion of the rock only in the direction away from said arm member; and resilient means applying a bias force to said arm member for moving said arm member in a direction causing the tensioner body to maintain tension in the chain, said arm member, said pivot means said rocking member, said rod and said resilient means being located inwardly of the loop.

* * * * *